(12) United States Patent  
Alrabady (10) Patent No.: US 6,741,170 B2
(45) Date of Patent: May 25, 2004

(54) APPARATUS FOR MONITORING ROTATION OF AN OBJECT ABOUT AN AXIS

(75) Inventor: Ansaf Ibrahem Alrabady, Livonia, MI (US)

(73) Assignee: TRW Inc., Lyndhurst, OH (US)

( * ) Notice: Subject to any disclaimer, the term of this patent is extended or adjusted under 35 U.S.C. 154(b) by 118 days.

(21) Appl. No.: 10/037,796

(22) Filed: Jan. 4, 2002

(65) Prior Publication Data

US 2003/0128128 A1 Jul. 10, 2003

(51) Int. Cl.[7] ............................................... B60Q 1/00
(52) U.S. Cl. ..................... 340/438; 340/442; 340/444; 340/426.16; 340/426.15; 340/429; 340/671; 340/672; 200/61.45 R; 200/61.49; 200/61.45; 200/61.46
(58) Field of Search ................. 340/438, 442, 340/444, 426.16, 426.15, 429, 671, 672; 200/61.45 R, 61.49, 61.45, 61.46

(56) References Cited

U.S. PATENT DOCUMENTS

| 4,110,732 A | 8/1978 | Jarocha et al. ................. 340/58 |
| 4,229,728 A | 10/1980 | Tremba ......................... 340/58 |
| 4,531,112 A | 7/1985 | Thomas ........................ 340/58 |
| 5,463,374 A | * 10/1995 | Mendez et al. ............. 340/442 |
| 5,783,992 A | * 7/1998 | Eberwine et al. ........... 340/445 |
| 6,204,758 B1 | 3/2001 | Wacker et al. .............. 340/444 |
| 6,252,498 B1 | * 6/2001 | Pashayan, Jr. .............. 340/447 |
| 6,278,363 B1 | 8/2001 | Bezek et al. ................. 340/442 |
| 6,384,720 B1 | * 5/2002 | Juzswik et al. ............. 340/442 |
| 6,388,568 B1 | * 5/2002 | Arita et al. .................. 340/442 |
| 6,414,592 B1 | * 7/2002 | Dixit et al. .................. 340/447 |

* cited by examiner

Primary Examiner—Daniel J. Wu
Assistant Examiner—Tai T. Nguyen
(74) Attorney, Agent, or Firm—Tarolli, Sundheim, Covell & Tummino L.L.P.

(57) ABSTRACT

A sensor (36) for monitoring rotation of an object (16) about an axis (20) comprises a switch member (40) that is urged into a neutral position and is movable relative to the object (16). A direction of movement of the switch member (40) relative to the object (16) is indicative of a direction of rotation of the object (16). Inertia of the switch member (40) during initial rotation of the object (16) results in relative movement of the switch member (4) away from the neutral position. Centrifugal force during object (16) rotation further enhances the relative movement of the switch member (40). The sensor (36) also comprises a device (56) for monitoring a direction of movement of the switch member (40) and for providing a signal indicative thereof.

26 Claims, 3 Drawing Sheets

APPARATUS FOR MONITORING ROTATION OF AN OBJECT ABOUT AN AXIS

TECHNICAL FIELD

The present invention relates to a sensor for monitoring rotation of an object about an axis. More particularly, the present invention relates to a sensor for monitoring a direction of rotation of a vehicle tire about its mounting axis.

BACKGROUND OF THE INVENTION

Monitoring a condition of a vehicle tire during operation of the vehicle is becoming increasingly more popular with the use of run-flat tire technology. Tire condition monitors alert the vehicle driver when a tire condition is outside of a normal operating range. For example, if the pressure in a particular tire is low, the tire condition monitor associated with that tire can alert the driver of the low pressure condition.

TECHNICAL FIELD

The present invention relates to a sensor for monitoring rotation of an object about an axis. More particularly, the present invention relates to a sensor for monitoring a direction of rotation of a vehicle tire about its mounting axis.

BACKGROUND OF THE INVENTION

Monitoring a condition of a vehicle tire during operation of the vehicle is becoming increasingly more popular with the use of run-flat tire technology. Tire condition monitors alert the vehicle driver when a tire condition is outside of a normal operating range. For example, if the pressure in a particular tire is low, the tire condition monitor associated with that tire can alert the driver of the low pressure condition.

There are many known tire condition monitoring systems. Many of the known tire condition monitoring systems have tire condition monitors that sense pressure within a tire. The tire condition monitors transmit signals indicative of either an alert condition or indicative of the actual pressure within the tire. A vehicle based controller receives the transmitted signals. Generally, each tire of the vehicle has an associated tire condition monitor. Thus, it is desirable to correlate signals received at the vehicle based controller with the particular tire condition monitor sending the signal.

Some of the known tire condition monitoring systems provide each tire condition monitor with an associated identification code. The vehicle based controller is programmed with the respective identification codes and the location on the vehicle correlating to each respective identification code. With these known systems, the vehicle based controller must be reprogrammed each time a tire condition monitor is replaced or each time the tires of the vehicle are rotated.

Other known tire condition monitoring systems wire antennas into each wheel well of the vehicle. Each wheel well antenna receives the transmitted signals from its associated tire condition monitor and transfers the signals to the vehicle based unit. Since the wheel well antennas are hard wired to the vehicle based unit, the location of a tire condition monitor providing a condition signal is known.

SUMMARY OF THE INVENTION

In accordance with an exemplary embodiment of the present invention, a sensor is provided for monitoring a direction of rotation of an object about an axis. The sensor comprises a switch member that is urged into a neutral position relative to the object and is movable relative to the object away from the neutral position. A direction of relative movement between the switch member and the object is indicative of the direction of rotation of the object. Inertia of the switch member during initial rotation of the object results in relative movement of the switch member away from the neutral position. Centrifugal force during object rotation further acts on the switch member to enhance the relative movement of the switch member away from the neutral position. The sensor further comprises a device for monitoring the direction of relative movement between the switch member and the object and for providing a signal indicative thereof.

In accordance with another exemplary embodiment of the present invention, a sensor is provided for monitoring rotation of an object about an axis. The sensor comprises a movable switch member that is urged into a neutral position and that is adapted so as to move relative to switch contacts in response to rotational acceleration of the object. The switch member is further responsive to centrifugal force resulting from object rotation so as to enhance movement of the switch member and thereby close the switch contacts. Closure of the switch contacts is indicative of the direction of rotation of the object. The sensor also comprises a device for monitoring switch closure and for providing a signal indicative thereof.

In accordance with yet another exemplary embodiment of the present invention, an apparatus is provided for sensing a condition of a vehicle tire. The apparatus comprises a tire rotation sensor for monitoring rotation of the vehicle tire about its mounting axis. The tire rotation sensor includes a movable switch member and a monitoring device. The switch member is urged into a neutral position relative to the tire and is movable relative to the tire away from the neutral position. A direction of relative movement between the switch member and the tire is indicative of the direction of rotation of the tire. Inertia of the switch member during initial rotation of the tire results in relative movement of the switch member away from the neutral position. Centrifugal force during tire rotation further acts on the switch member to enhance the relative movement of the switch member away from the neutral position. The monitoring device monitors the direction of movement of the switch member and provides a rotation direction signal indicative thereof. The apparatus further comprises a controller for receiving the rotation direction signal from the monitoring device and for providing a transmission signal indicative of the rotation direction signal. The apparatus still further comprises a transmitter for transmitting the transmission signal.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
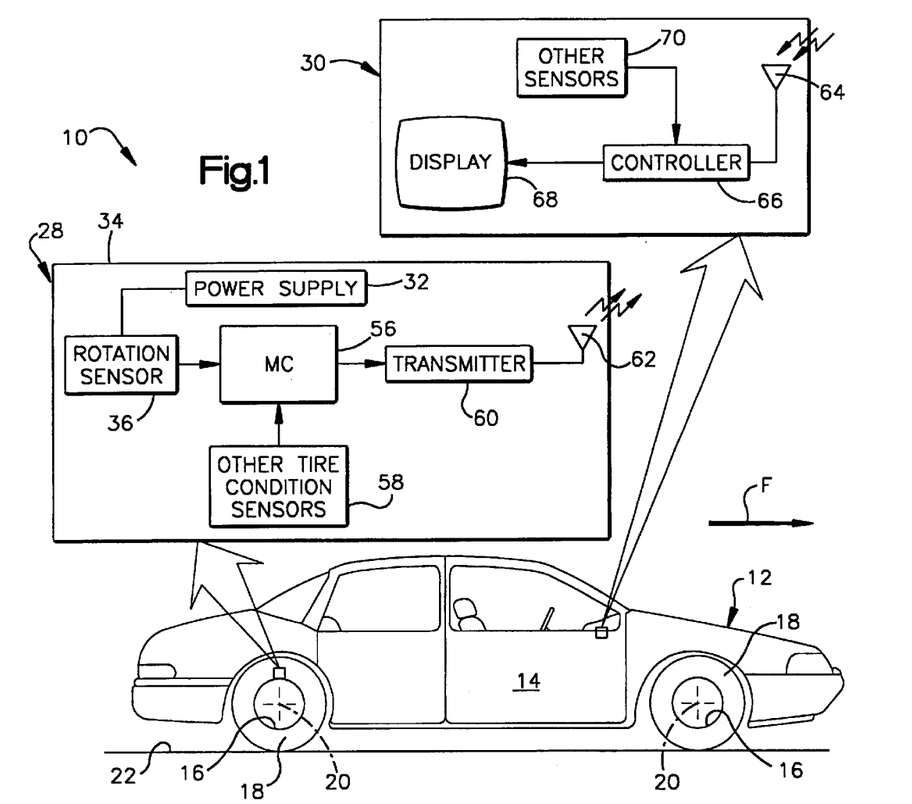
FIG. 1 is a schematic illustration of a vehicle including an apparatus constructed in accordance with an exemplary embodiment of the present invention.

FIG. 1 illustrates a passenger vehicle 12 including an apparatus 10 constructed in accordance with the present invention. The vehicle 12 includes a driver side, hidden from view in FIG. 1, and a passenger side 14. The vehicle 12 also includes four wheels 16. Two of the wheels 16 are located on the driver side of the vehicle 12 and are not shown in FIG. 1. Two of the wheels 16 are located on the passenger side 14 of the vehicle 12.

A tire 18 is mounted to each wheel 16 of the vehicle 12 in a known manner. When mounted to a respective wheel 16, the tire 18 is fixed for rotation with the respective wheel. As the respective wheel 16 rotates about its mounting axis 20, frictional resistance between the tire 18 and the ground 22 propels the vehicle in the appropriate direction.

Figure 2:
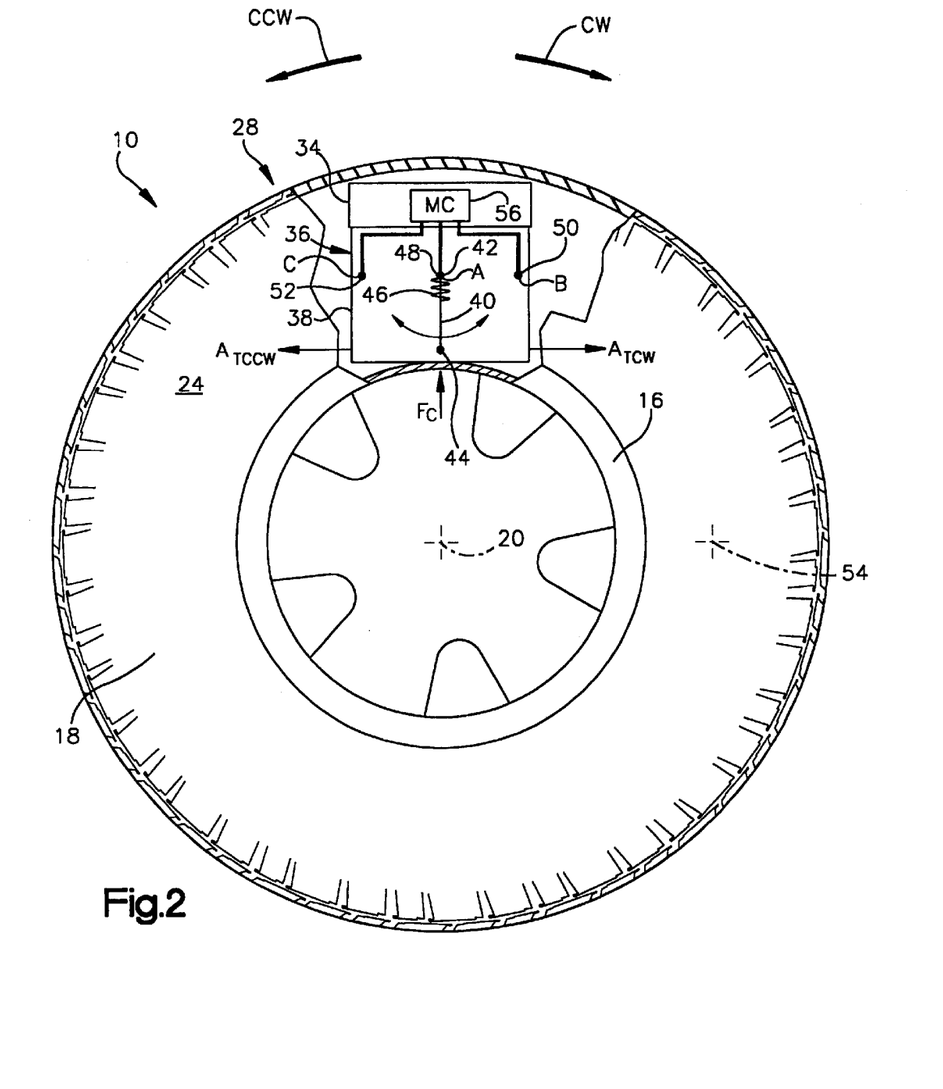
FIG. 2 is a schematic illustration of a vehicle tire including an exemplary embodiment of a tire rotation monitor in accordance with the present invention for the apparatus of FIG. 1.

FIG. 2 schematically illustrates a wheel 16 including an associated tire 18 mounted thereon. The wheel 16 and associated tire 18 in FIG. 2 is representative of any wheel/tire combination on the vehicle 12. Preferably, each of the wheel/tire combinations of the vehicle 12 includes an associated tire condition monitor discussed below and shown in the accompanying drawings.

The wheel 16 and associated tire 18 include an inboard side (not shown) and an outboard side 24 (FIG. 2). The wheel 16 is mounted to an associated wheel hub of the vehicle 12 in a known manner. When mounted, the outboard side 24 faces outward.

When the vehicle 12 moves in a forward direction, indicated by the arrow F in FIG. 1, the wheels 16 on the passenger side 14 of the vehicle rotate in a clockwise direction when viewed from the outboard side 24 on the passenger side of the vehicle. Contrarily, the wheels 16 on the driver side of the vehicle 12 rotate in a counterclockwise direction when viewed from the outboard side on the driver side of the vehicle. Thus, when a direction of travel of the vehicle 12 is known, the direction of rotation of the wheel 16 is indicative of a side of the vehicle 12 upon which the wheel and the tire 18 associated with the wheel are located.

With reference to FIG. 1, the apparatus 10 of the present invention includes a vehicle tire condition monitor 28, and a vehicle based control unit 30. The vehicle tire condition monitor 28 is mounted to a wheel 16 of the vehicle 12 in a known manner. Preferably, each wheel 16 of the vehicle 12 includes an associated vehicle tire condition monitor 28. Each vehicle tire condition monitor 28 includes a power supply 32. Preferably, the power supply 32 is a long life battery.

The vehicle based control unit 30 is mounted on the body of the vehicle 12, such as in the vehicle cabin. The vehicle based control unit 30 works in conjunction with all of the vehicle tire condition monitors 28 to alert a vehicle driver of alert conditions in the respective tires 18 of the vehicle 12.

Each vehicle tire condition monitor 28 includes a housing 34. The vehicle tire condition monitor 28 also includes a rotation sensor 36. The rotation sensor 36 may be mounted within the housing 34 of the vehicle tire condition monitor 28, as shown in FIG. 1 or may include a separate housing as shown in FIG. 2 at 38. If the rotation sensor 36 includes a separate housing 38, the rotation sensor preferably is mounted adjacent to and is operatively connected to the housing 34 of the vehicle tire condition monitor 28.

One exemplary embodiment of the rotation sensor 36, illustrated in FIG. 2, includes a pendulum 40 and first and second electrical switches AB and AC, respectively. The pendulum 40 is formed from an electrically conductive material and includes first and second ends 42 and 44, respectively. The first end 42 of the pendulum 40 is pivotally attached to the housing 38. The pivotal attachment of the first end 42 allows the pendulum 40 to move or swing through a predefined path within a given plane. The second end 44 of the pendulum 40 includes a weight. The weighted second end 44 of the pendulum 40 is located radially inwardly of the first end 42 of the pendulum 40 with respect to the mounting axis 20 of the wheel 16.

A spring 46 is attached to the housing 38 and contacts a portion of the pendulum 40 adjacent the first end 42. The spring 46 biases the pendulum 40 into a neutral position, shown in FIG. 2. In the neutral position, the weighted second end 44 of the pendulum 40 is approximately aligned between the first end 42 of the pendulum 40 and the mounting axis 20 of the wheel 16.

The first electrical switch AB includes first and second electrical contacts 48 and 50, respectively. The first electrical contact 48 is located at the first end 42 of the pendulum 40. The second electrical contact 50 is spaced from the first electrical contact 48 within a plane of movement of the pendulum 40. As will be discussed in further detail below, when the pendulum 40 is in its neutral position, the first and second electrical contacts 48 and 50 are not electrically connected to one another, i.e., switch AB is open. When the pendulum 40 is swung fully to the right, as viewed in FIG. 2, the first and second electrical contacts 48 and 50 are electrically connected to one another through the pendulum 40, i.e., switch AB is closed.

The second electrical switch AC includes the first electrical contact 48 and a third electrical contact 52. The third electrical contact 52 is spaced from the first electrical contact 48 within the plane of movement of the pendulum 40. The third electrical contact 52 is located on a side of the neutral position opposite the second electrical contact 50. As will be discussed in further detail below, when the pendulum 40 is in its neutral position, the first and third electrical contacts 48 and 52 are not electrically connected to one another, i.e., switch AC is open. When the pendulum 40 is swung fully to the left, as viewed in FIG. 2, the first and third electrical contacts 48 and 52 are electrically connected to one another through the pendulum 40, i.e., switch AC is closed.

The rotation sensor 36 of FIG. 2 indicates a direction of rotation of the vehicle wheel 16 about its mounting axis 20. By knowing the direction of rotation of the wheel 16 and knowing whether the vehicle 12 is moving forward or rearward, the side of the vehicle upon which the wheel 16 is located is known.

During rotation of the vehicle wheel 16, both inertia and rotational forces act on the weighted second end 44 of the pendulum 40. When the wheel 16 first begins to rotate, the housing 38 of the rotation sensor 36 accelerates with the acceleration of the wheel. During acceleration of the housing 38, inertia of the weighted second end 44 is such that the force of spring 46 is overcome and the weighted second end of the pendulum 40 moves relative to the housing 38 and away from the neutral position toward one of the second and third electrical contacts 50 and 52, depending on the direction of rotation of the wheel 16. After the weighted second end 44 of the pendulum 40 has moved away from the neutral position, a force resulting from radial acceleration begins to act on the weighted second end 44 and enhances further movement of the weighted second end away from the neutral position.

Radial acceleration, designated $A_r$, experienced by the weighted second end 44 of the pendulum 40 can be expressed as:

$$A_r = \omega^2 / r$$

where $\omega$ is the angular velocity of the wheel, i.e., the change in angle $\theta$ over time or $d\theta/dt$, and where r is the radius from the mounting axis 20 of the wheel 16 to the weighted second end. The value of r changes as the weighted second end 44 of the pendulum 40 moves.

Tangential acceleration, designated $A_T$, acting on the housing 38, or on a point on the wheel 16, may be expressed as:

$$A_T = \alpha r$$

where $\alpha$ is the angular acceleration of the housing 38 or point on the wheel 16, i.e., the change in angular velocity $\omega$ over time or $d\omega/dt$, and where r is the radius from the mounting axis 20 of the wheel 16 to the housing 38 or point on the wheel 16.

The inertia of the weighted second end 44 of the pendulum 40 resists movement during the tangential acceleration of the housing 38. As a result of the inertia of the weighted second end 44, tangential acceleration of the housing 38 results in relative movement of the weighted second end, relative to the housing 38, in a direction opposite the component of tangential acceleration that acts on the housing. As a result of continued rotation of the wheel 16, the weighted second end 44 of the pendulum experiences a centrifugal force that tends to push the weighted second end radially outwardly relative to the mounting axis 20 of the vehicle wheel 16.

With reference again to FIG. 2, when the vehicle wheel 16 is at rest, i.e., not rotating, the spring 46 biases or urges the pendulum to position the weighted second end 44 of the pendulum 40 in the neutral position. The spring 46 insures that a respective switch AB or AC is not closed when the vehicle wheel 16 is at rest. For example, assuming that the vehicle wheel 16 comes to rest in a position so that the rotation sensor 36 is located at the position indicated at 54 in FIG. 2. Without the spring 46 biasing or urging the pendulum 40 into the neutral position, gravity would pull the second end 44 of the pendulum 40 downward, as viewed in FIG. 2, and may result in the closure of the first switch AB. If gravity closes the first switch AB, the rotation sensor 36 would falsely indicate a rotation of the vehicle wheel 16. By biasing the pendulum 40 into the neutral position, such false indications of rotation as a result of gravitational pull on the weighted second end 44 are avoided. Therefore, the spring 46 must be of sufficient strength to keep the weighted second end 44 of the pendulum 40 in the neutral position when the wheel 16 is not rotating regardless of where the wheel, and, in turn, where the rotation sensor 36 stops. Those skilled in the art will recognize that the effect of gravity must be considered when selecting a biasing force of the spring 46 so that the weighted second end 44 of the pendulum 40 is maintained in the neutral position when the tire is at rest.

When the vehicle wheel 16 of FIG. 2 begins to accelerate from a rest position, the housing 38 of the rotation sensor 36 begins to accelerate. The inertia of the weighted second end 44 of the pendulum 40 resists movement. As a result, the weighted second end 44 moves relative to the housing 38 in a direction opposite the tangential acceleration acting on the housing. The bias or urge of the spring 46 resists the initial relative movement of the weighted second end 44 of the pendulum 40 relative to the housing 38. After the weighted second end 44 overcomes the spring bias force and is moved away from or out of the neutral position, further movement of the weighted second end 44 occurs due to centrifugal force $F_c$. The centrifugal force $F_c$ increases as the angular velocity of the vehicle wheel 16 increases.

Specifically, when the vehicle wheel 16 begins to rotate in a clockwise direction, indicated by the arrow CW in FIG. 2, the housing 38 of the rotation sensor 36 accelerates. The inertia of the weighted second end 44 of the pendulum 40 resists the acceleration forces. As a result of the inertia resisting tangential acceleration $A_{TCW}$ of the housing 38, the weighted second end 44 of the pendulum 40 moves relative to the housing 38 in a leftward direction, as viewed in FIG. 2, away from the neutral position and toward the third electrical contact 52. The direction of relative movement of the weighted second end 44, relative to housing 38, is opposite the direction of the tangential acceleration of the wheel 16 and housing 38.

When the weighted second end 44 is in the neutral position, any centrifugal force $F_c$ acting on the weighted second end would be resisted by the structure of the pendulum 40. Once the weighted second end 44 of the pendulum 40 moves away from the neutral position, the structure of the pendulum moves to an angle that is offset from an imaginary line between the first end 42 of the pendulum and the mounting axis 20 of the wheel 16. As a result, centrifugal force $F_c$ begins to affect movement of the weighted second end 44 of the pendulum 40. The centrifugal force $F_c$ enhances the movement of the weighted second end toward the third electrical contact 52. Even if the vehicle wheel 16 begins to rotate at a constant velocity, the centrifugal force $F_c$ continues to act on the weighted second end 44 of the pendulum 40 to move of the weighted second end toward the third electrical contact 52.

Similarly, when the pendulum 40 is in a neutral position and the vehicle wheel begins to accelerate in a counterclockwise direction, indicated by CCW in FIG. 2, inertia resists the tangential acceleration $A_{TCCW}$ of the housing 38 and results in the weighted second end 44 of the pendulum 40 moving rightward, as viewed in FIG. 2, relative to the housing. After the second end 44 of the pendulum 40 moves rightward, the centrifugal force $F_c$ enhances the movement of the weighted second end 44 toward the second electrical contact 50.

In summary, initial movement of the weighted second end 44 of the pendulum 40 away from the neutral position is affected only by inertia of the weighted second end resisting the tangential acceleration $A_{TCW}$ or $A_{TCCW}$ of the housing 38. After the weighted second end 44 of the pendulum 40 moves away from the neutral position, centrifugal force $F_c$ enhances further movement of the weighted second end of the pendulum away from the neutral position.

Additionally, the centrifugal force $F_c$ acts on the weighted second end 44 of the pendulum 40 to maintain the weighted second end of the pendulum against a respective electrical contact 50 or 52 thereby providing switch closure. For example, when the weighted second end 44 of the pendulum 40 moves against the second electrical contact 50, the centrifugal force $F_c$ will continue to act on the weighted second end to maintain closure of the first switch AB. When the vehicle wheel 16 begins to rotate at a constant speed or when the vehicle wheel decelerates slightly, the first switch AB will remain closed.

In the embodiment of the rotation switch 36 illustrated in FIG. 2, the second and third electrical contacts 50 and 52 are tangentially aligned, relative to the mounting axis 20 of the wheel 16, with the first end 42 of the pendulum 40 or the first electrical contact 48. Thus, when the pendulum 40 moves to close one of the first and second switches AB or AC, the pendulum moves into a position where the structure of the pendulum extends tangentially. As a result, the structure of the pendulum 40 resists any tangential force or inertial force resulting from tangential acceleration that may act on the weighted second end 44 of the pendulum 40 to open the respective switch AB or AC. Thus, the second end 44 of the pendulum of the rotation switch 36 remains in contact with a respective electrical contact 50 or 52 until the centrifugal force $F_c$ acting on the weighted second end 44 becomes less than the spring force biasing or urging the pendulum 40 toward the neutral position. The spring 46 may be chosen so that a respective switch AB or AC will remain closed as long as the vehicle 12 is traveling above a threshold speed. For example, the spring 46 may be chosen so that the respective switch AB or AC remains closed until the vehicle speed decreases below five miles per hour.

With reference again to FIG. 1, the vehicle tire condition monitor 28 also includes a microcontroller 56. The functions of the microcontroller 56 could be accomplished using digital/analog circuits or an application-specific integrated circuit ("ASIC"). The microcontroller 56 is operatively connected to the rotation sensor 36 and receives a rotation direction signal from the rotation sensor indicative of the direction of rotation of the wheel 16. In one embodiment, the microcontroller 56 monitors to determine if the first switch AB is closed or if the second switch AC is closed.

The vehicle tire condition monitor 28 may also include other tire condition sensors 58 that are operatively connected with the microcontroller 56. The other tire condition sensors 58 may include tire pressure and tire temperature sensors.

In the embodiment illustrated in FIG. 1, the rotation sensor 36 is wired in series between the power supply 32 and the microcontroller 56. As a result, the microcontroller 56 does not receive electrical power until a respective switch AB or AC of the rotation sensor closes. This embodiment reduces the power consumption of the vehicle tire condition monitor 28 and prolongs battery life.

In an alternative embodiment, the microcontroller 56 may be continuously supplied with electrical energy from the power source 32. The microcontroller 56 may enter a sleep mode to reduce energy consumption and "wake-up" from the sleep mode when a respective switch AB or AC of the rotation sensor 36 closes or periodically wake-up to determine if either switch AB or AC is closed.

The microcontroller 56 of FIG. 1 receives the rotation direction signal from the rotation sensor 36 and other signals from the other tire condition sensors 58. The microcontroller 56 processes the received signals and outputs a transmission signal that is indicative of the received signals, including the determined direction of rotation of the tire. The transmission signal may also include a preamble, tire identification information, checksum information, and a postamble.

The vehicle tire condition monitor 28 also includes a transmitter 60 and an antenna 62. The transmitter 60 receives the transmission signal from the microcontroller 56 and transmits the signal via the antenna 62. Preferably, the transmitted signal is a radio frequency signal.

As shown in FIG. 1, the vehicle based control unit 30 includes an antenna 64, a controller 66, a display 68, and may include other sensors 70. The antenna 64 receives the transmission signal and transfers the transmission signal to the controller 66.

The controller 66 preferably is a microcomputer or an ASIC. The controller 66 demodulates the transmission signal and processes the received signals, including the rotation direction signal and signals from the other tire condition sensors 58. The controller 66 may run an algorithm that takes samples of the rotation direction signal over time to determine a rotation of the wheel. Based on the rotation of the wheel, the controller 66 can determine a side of the vehicle upon which the wheel 16 is mounted.

The other sensors 70 in the vehicle based control unit 30 may indicate a direction of travel of the vehicle. In one embodiment, the other sensors 70 may include a vehicle transmission position sensor (not shown) that senses the gear in which the vehicle transmission is positioned and provides a gear signal indicative thereof to the controller 66. For example, assuming the vehicle 12 has an automatic vehicle transmission, if the vehicle transmission is in DRIVE, the vehicle transmission position sensor provides a gear signal to the controller 66 indicating that any motion of the vehicle 12 is forward motion. The controller 66 then processes the rotation direction signal with knowledge of the direction of movement of the vehicle 12 and can easily determine a side of the vehicle upon which the respective vehicle wheel 16 is located.

The display 68 may be used to alert the driver of a sensed tire condition. Additionally, the display 68 may be used to indicate to the driver the side of the vehicle 12 upon which the alert condition applies. Thus, if a vehicle tire 18 has low pressure, the display 68 may alert the driver of the low pressure and indicate a side of the vehicle 12 having the low pressure tire. This prevents the driver from having to check each tire 18 of the vehicle 12 to determine which tire has actuated the alert condition.

Figure 3:
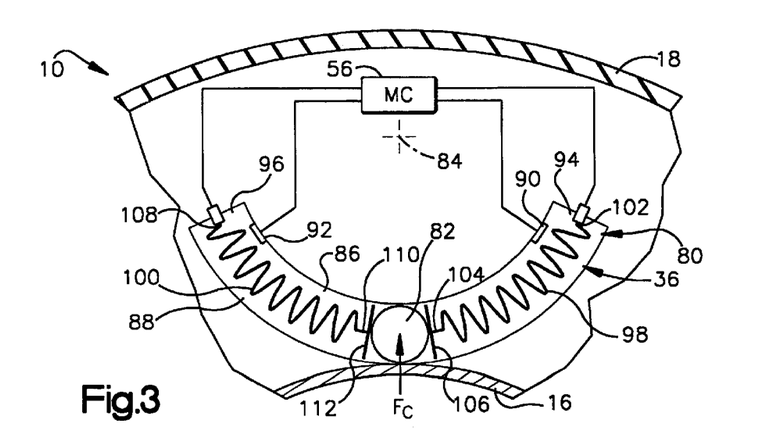
FIG. 3 is a schematic illustration of a second exemplary embodiment of a tire rotation monitor in accordance with the present invention for the apparatus of FIG. 1.

FIG. 3 is a schematic illustration a second exemplary embodiment of a rotation sensor 36 in accordance with the present invention for use in the apparatus 10 of FIG. 1. The rotation sensor 36 in FIG. 3 includes a housing 80 and a movable member 82. The housing 80 is fixed relative to the vehicle wheel 16 in an appropriate manner and rotates with the vehicle wheel. The housing 80 defines a path through which the member 82 is movable. The path is arcuate and extends about a center point indicated at 84. The center point 84 is located radially outwardly of the path relative to the mounting axis 20 of the vehicle wheel 16. The path includes an arcuate inner wall 86 nearest the center point 84 of the path and an outer wall 88 that extends parallel to the inner wall. Electrical contact 90 is located on the inner wall 86 of the path near a first end 94 of the path and electrical contact 92 is located on the inner wall of the path near the second end 96 of the path. Alternatively, one or both of electrical contacts 90 and 92 may be located on an outer wall 88 of the path.

A neutral position and first and second rotation positions are defined within the path. The neutral position is located at the intersection of the path and an imaginary line connecting the center point 84 of the path to the mounting axis 20 of the vehicle wheel 16. The first rotation position is located near a first end 94 of the path. The second rotation position is located near a second end 96 of the path, on an opposite side of the neutral position from the first rotation position.

The rotation sensor 36 of FIG. 3 also includes two electrically conductive biasing elements or springs 98 and 100. A first electrically conductive biasing element 98 includes first and second ends 102 and 104, respectively. The first end 102 of the first biasing element 98 is connected to the first end 94 of the path. The second end 104 of the first biasing element 98 supports electrical contact 106. Electrical contact 90 and electrical contact 106 collectively form a first rotation switch. A length of the first biasing element 98 is sized so that when in a relaxed state, the electrical contact 106 is positioned adjacent the neutral position.

A second electrically conductive biasing element 100 also includes first and second ends 108 and 110, respectively. The first end 108 of the second biasing element 100 is connected to the second end 96 of the path. The second end 110 of the second biasing element 100 supports electrical contact 112. Electrical contact 92 and electrical contact 112 collectively form a second rotation switch. A length of the second biasing element 100 is sized so that when in a relaxed state, the electrical contact 112 is positioned adjacent the neutral position.

The rotation sensor 36 of FIG. 3 operates under the same principles as the rotation sensor of FIG. 2. When located in the neutral position, the inner surface 86 of the path resists any radial movement of the member 82. Thus, inertia of member 82 resulting from the tangential acceleration of the housing 80 initiates movement of the member 82 relative to the housing. The member 82 moves relative to the housing 80 and away from the neutral position when the inertia overcomes the bias or urge of a respective biasing element 98 or 100.

After being moved away from the neutral position, centrifugal force $F_c$ enhances movement of the member 82 toward either the first or second end 94 or 96 of the path, depending upon direction of initial movement of the member 82 relative to the housing. When the member 82 arrives at the first or second rotation position, the rotation switch associated with the respective position is closed. The rotation switch remains closed until forces acting to move the member 82 toward the neutral position overcome the centrifugal force $F_c$ maintaining the member in the respective rotation position relative to electrical contacts 90 and 92.

Figure 4:
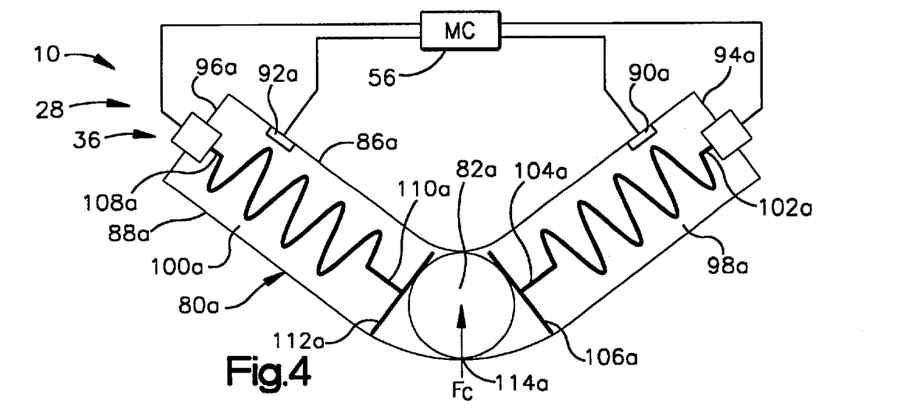
FIG. 4 is a schematic illustration of a third exemplary embodiment of a tire rotation monitor in accordance with the present invention for the apparatus of FIG. 1.

FIG. 4 is a schematic illustration of a third exemplary embodiment of a rotation sensor 36 in accordance with the present invention. Structures in FIG. 4 that are the same as or similar to structures described in FIG. 3 will be referred to with the same reference number with the addition of the suffix "a". The rotation sensor 36 of FIG. 4 is identical to the rotation sensor of FIG. 3 with the exception that the path within the housing 80*a* in FIG. 4 is angular as opposed to arcuate. In FIG. 4, the neutral position is located at the origin 114*a* of the angular path. The rotation sensor of FIG. 4 operates in the same manner as the rotation sensor of FIG. 3.

Figure 5A:
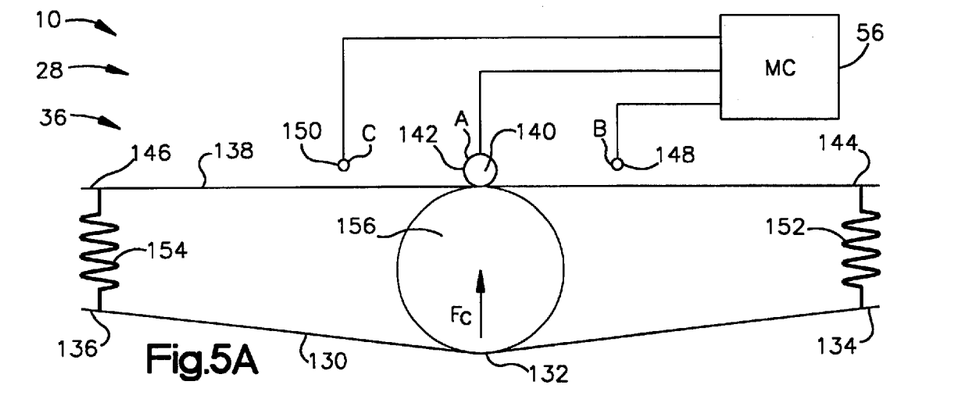
FIGS. 5A and 5B are schematic illustrations of a fourth exemplary embodiment of a tire rotation monitor in accordance with the present invention for the apparatus of FIG. 1.
Figure 5B:
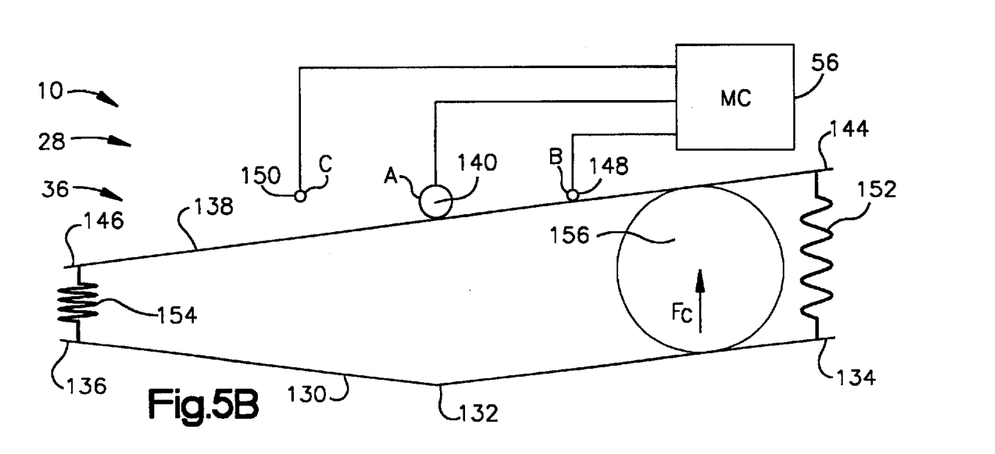

FIGS. 5A and 5B are schematic illustrations of a fourth exemplary embodiment of the rotation sensor 36 in accordance with the present invention. The rotation sensor 36 of FIGS. 5A and 5B includes a curved plate 130 that is fixed relative to the mounting axis 20 of the vehicle wheel 16. The curved plate 130 forms an obtuse angle. An origin 132 of the obtuse angle forms a radially innermost portion of the curved plate 130, with respect to the mounting axis 20 of the wheel 16. The curved plate 130 also includes first and second ends 134 and 136, respectively, located on opposite sides of the origin 132.

The rotation sensor 36 of FIGS. 5A and 5B also include a teeter-totter switch 138 that is located radially outwardly of the curved plate 130. The teeter-totter switch 138 includes a central fulcrum 140 that is radially aligned with the origin 132 of the curved plate 130 and the mounting axis 20 of the vehicle wheel 16. The central fulcrum 140 is fixed relative to the mounting axis of the wheel 16 and forms a first electrical contact 142. The teeter-totter switch 138 also includes first and second ends 144 and 146, respectively located on opposite sides of the central fulcrum 140.

The rotation sensor 36 also includes second and third electrical contacts 148 and 150, respectively. The second electrical contact 148 is rightward of the first electrical contact 142, as viewed in FIGS. 5A and 5B. The third electrical contact 150 is leftward of the first electrical contact 142, as viewed in FIGS. 5A and 5B. The first and second electrical contacts 142 and 148 collectively form a first switch AB. The first and third electrical contacts 142 and 150 collectively form a second switch AC.

A first biasing element 152 connects the first end 144 of the teeter-totter switch 138 to the first end 134 of the curved plate 130. A second biasing element 154 connects the second end 146 of the teeter-totter switch 138 to the second end 136 of the curved plate 130. The first and second biasing elements 152 and 154 bias the teeter-totter switch 138 into the position shown in FIG. 5A.

A path is defined between the curved plate 130 and the teeter-totter switch 138. The path includes a neutral position and first and second rotation positions. The neutral position is defined as a position between the origin 132 of the curved plate 130 and the central fulcrum 140 of the teeter-totter switch 138. The first rotation position is located between the first end 134 of the curved plate 130 and the first end 144 of the teeter-totter switch 138. The second rotation position is located between the second end 136 of the curved plate 130 and the second end 146 of the teeter-totter switch 138.

A movable member 156 is located in the path and moves from the neutral position to either the first or second rotation positions in response to rotation of the vehicle wheel 16. Walls of the housing, not illustrated, confine the movement of the member 156 to the path illustrated in FIGS. 5A and 5B. Preferably, the member 156 is a spherical steel ball.

FIG. 5A illustrates the member 156 in the neutral position. The biasing force of the biasing elements 152 and 154 are sufficient to resist movement of the member 156 in response to gravity so that the member is maintained in the neutral position when the wheel 16 is at rest. When the wheel 16 begins to rotate, the central fulcrum 140 of the teeter-totter switch 138 opposes any radial movement of the member 156. Inertia of the member 156 resists tangential acceleration, which initiates relative movement of the member 156 away from the neutral position. The member 156 begins to move toward one of the first and second rotation positions after the inertia overcomes the biasing force of the biasing elements 152 and 154.

Centrifugal force $F_c$ enhances further relative movement of the member 156 away from the neutral position. The centrifugal force $F_c$ pushes the member 156 against the teeter-totter switch 138 and causes the teeter-totter switch to rotate. For example with the member 156 moved rightward as shown in FIG. 5B as a result of counterclockwise rotation of the wheel 16, the teeter-totter switch 138 rotates counterclockwise, as viewed in FIGS. 5A and 5B, about the central fulcrum 140. When the member 156 is located in the first rotation position, as illustrated in FIG. 5B, the teeter-totter switch 138 contacts the second electrical contact 148 and the first switch AB closes. Centrifugal force $F_c$ maintains the member 156 in the first rotation position and maintains closure of the first switch AB until forces acting on the member to move the member toward the neutral position overcome the centrifugal force $F_c$.

The movement of the member 156 toward the second rotation position is similar to the movement of the member toward the first rotation position. When located at the second rotation position, the teeter-totter switch 138 contacts the third electrical contact 150 and the second switch closes AC.

From the above description of the invention, those skilled in the art will perceive improvements, changes and modifications. For example, Hall effect or optic sensors may be mounted adjacent the path of movement of the member 40, 82, 82a, or 156 for monitoring movement of the member. Such improvements, changes and modifications within the skill of the art are intended to be covered by the appended claims.

Having described the invention, I claim the following:

1. A sensor for monitoring a direction of rotation of an object about an axis, the sensor comprising:

a switch member being urged into a neutral position relative to the object and being movable relative to the object away from the neutral position, a direction of relative movement between the switch member and the object being indicative of the direction of rotation of the object, inertia of the switch member during initial rotation of the object resulting in relative movement of the switch member away from the neutral position, centrifugal force during object rotation further acting on the switch member to enhance the relative movement of the switch member away from the neutral position; and a device for monitoring the direction of relative movement between the switch member and the object and for providing a signal indicative thereof.

2. The sensor as defined in claim 1 wherein the member is movable through a predefined path, the path including the neutral position and a predetermined position into which the switch member moves during relative movement, the neutral position of the path being nearer the axis of the object than the predetermined position.

3. The sensor as defined in claim 2 further including structure for defining the path, the structure resisting relative movement of the switch member in a radial direction when the switch member is in the neutral position.

4. The sensor as defined in claim 3 wherein the structure resists relative movement of the switch member away from the predetermined position and toward the neutral position in response to tangential acceleration of the object.

5. The sensor as defined in claim 1 wherein centrifugal force maintains the switch member in the predetermined position until an angular velocity of the object falls below a threshold level.

6. The sensor as defined in claim 1 further including at least one spring, the at least one spring urging the switch member into the neutral position.

7. The sensor as defined in claim 6 wherein a force of the spring is sufficient to resist movement of the switch member as a result of gravity.

8. The sensor as defined in claim 1 wherein the device includes first and second electrical switches, the switch member moving relative to the object in a first direction to close the first electrical switch and moving relative to the object in a second direction, different from the first direction, to close the second electrical switch.

9. The sensor as defined in claim 1 wherein the device includes a teeter-totter switch.

10. A sensor for monitoring rotation of an object about an axis, the sensor comprising:

a movable switch member being urged into a neutral position and being adapted so as to move relative to switch contacts in response to rotational acceleration of the object, the switch member being further responsive to centrifugal force resulting from object rotation so as to enhance movement of the switch member and thereby close the switch contacts, closure of the switch contacts being indicative of a direction of rotation of the object; and a device for monitoring switch closure and for providing a signal indicative thereof.

11. The sensor as defined in claim 10 wherein a first of the switch contacts is located in a predetermined position, the neutral position being nearer the axis of the object than the predetermined position.

12. The sensor as defined in claim 11 wherein centrifugal force maintains the switch member in the predetermined position until an angular velocity of the object falls below a threshold level, centrifugal force thereby maintains closure of the switch contacts until the angular velocity of the object falls below the threshold level.

13. The sensor as defined in claim 10 further including at least one spring, the at least one spring urging the switch member into the neutral position.

14. The sensor as defined in claim 13 wherein a force of the spring is sufficient to resist movement of the switch member as a result of gravity.

15. An apparatus for sensing a condition of a vehicle tire, the apparatus comprising:

a tire rotation sensor for monitoring rotation of the vehicle tire about its mounting axis, the tire rotation sensor including a movable switch member and a monitoring device, the switch member being urged into a neutral position relative to the tire and being movable relative to the tire away from the neutral position, a direction of relative movement between the switch member and the tire being indicative of the direction of rotation of the tire, inertia of the switch member during initial rotation of the tire resulting in relative movement of the switch member away from the neutral position, centrifugal force during tire rotation further acting on the switch member to enhance the relative movement of the switch member away from the neutral position, the monitoring device monitoring the direction of movement of the switch member and providing a rotation direction signal indicative thereof;

a controller for receiving the rotation direction signal from the monitoring device and for providing a transmission signal indicative of the rotation direction signal; and a transmitter for transmitting the transmission signal.

16. The apparatus as defined in claim 15 wherein the switch member of the tire rotation sensor is movable relative to the tire through a predefined path, the path including the neutral position and a predetermined position, the neutral position of the path being nearer the mounting axis of the tire than the predetermined position.

17. The apparatus as defined in claim 16 further including structure for defining the path, the structure resisting relative movement of the switch member in a radial direction when the switch member is in the neutral position.

18. The apparatus as defined in claim 17 wherein the structure resists movement of the switch member away from the predetermined position and toward the neutral position in response to tangential acceleration of the tire.

19. The apparatus as defined in claim 16 wherein centrifugal force maintains the switch member in the predetermined position until an angular velocity of the tire falls below a threshold level.

20. The apparatus as defined in claim 15 further including at least one spring, the at least one spring urging the switch member into the neutral position.

21. The apparatus as defined in claim 20 wherein a force of the spring is sufficient to resist movement of the switch member as a result of gravity.

22. The apparatus as defined in claim 15 wherein the monitoring device includes first and second electrical switches, the switch member moving relative to the tire in a first direction to close the first electrical switch and moving relative to the tire in a second direction, different from the first direction, to close the second electrical switch.

23. The apparatus as defined in claim 15 wherein the monitoring device includes a teeter-totter switch.

24. The apparatus as defined in claim 15 wherein the tire rotation sensor is operatively connected to the controller in a manner such that the controller is not powered until the tire rotation sensor indicates the direction of rotation of the tire.

25. The apparatus as defined in claim 15 further including a vehicle based unit for receiving the transmission signal, the vehicle based unit also receiving a vehicle travel signal from other sensors, the vehicle based unit processing the transmission signal and the vehicle travel signal to determine a location of the vehicle tire.

26. The apparatus as defined in claim 25 wherein the other sensors include a vehicle transmission position sensor.

* * * * *